United States Patent
Asadi et al.

[11] Patent Number: 6,018,868
[45] Date of Patent: Feb. 1, 2000

[54] METHOD FOR MANUFACTURING A PISTON

[75] Inventors: Hassan Asadi, Schweinfurt; Gerald Fenn, Pfersdorf; Hans Luksch, Kirchlauter, all of Germany

[73] Assignee: Mannesmann Sachs AG, Schweinfurt, Germany

[21] Appl. No.: 09/134,487

[22] Filed: Aug. 14, 1998

[30] Foreign Application Priority Data

Aug. 14, 1997 [DE] Germany ............... 197 35 249

[51] Int. Cl.$^7$ .................................................. H01B 19/00
[52] U.S. Cl. ............................................ 29/888.04; 29/557
[58] Field of Search ............................. 29/888.04, 557; 72/377, 359

[56] References Cited

U.S. PATENT DOCUMENTS

| | | | |
|---|---|---|---|
| 4,419,804 | 12/1983 | Axthammer | 29/888.04 |
| 4,765,167 | 8/1988 | Sampson | 29/888.04 |
| 4,887,449 | 12/1989 | Kanai et al. | 29/888.04 |

*Primary Examiner*—Irene Cuda
*Attorney, Agent, or Firm*—Cohen, Pontani, Lieberman & Pavane

[57] ABSTRACT

A method for manufacturing a piston, wherein the piston includes a piston body with through-channels for fluid which are covered by valve disks on supporting bodies with valve support surfaces. The piston body is constructed in one piece in a disk-shaped manner by press stamping. Starting from a base body of the piston, the raised areas of the piston body on one side of the piston are formed as depressions on the axially opposite side. The piston has at least one support for the valve disks whose axial height is adapted to the height of the support surfaces. The support on both sides of the piston is stamped from the base body of the piston and the valve support surfaces and the support are machined in the same manufacturing step on a common plane.

5 Claims, 2 Drawing Sheets

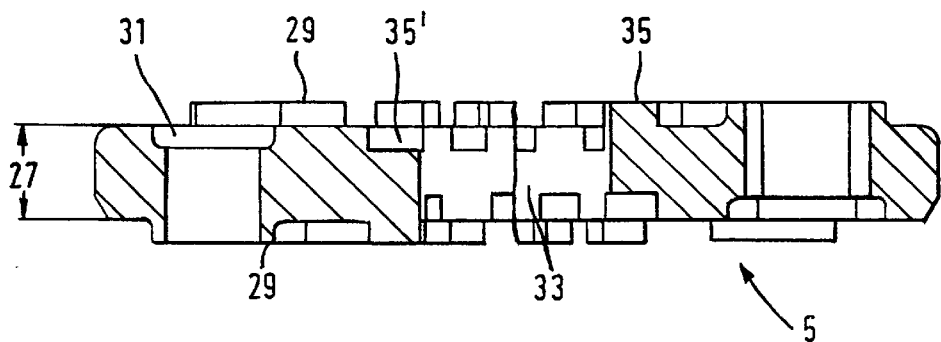
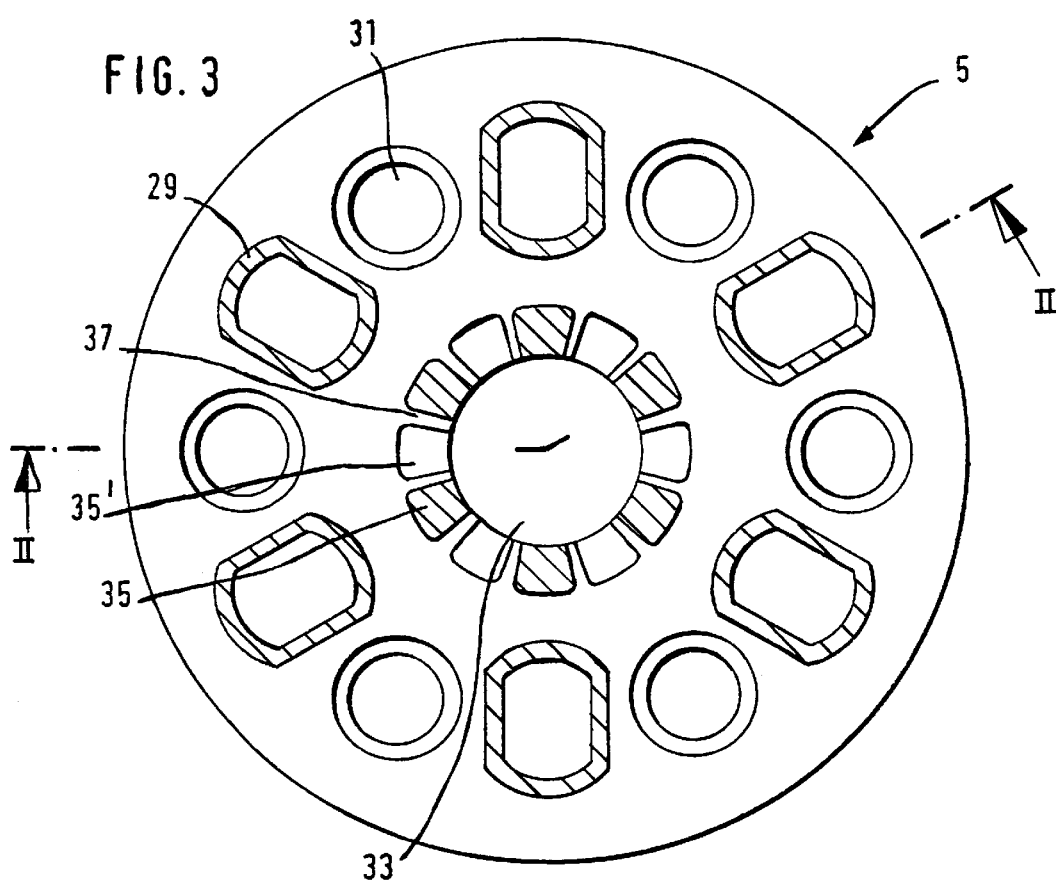

METHOD FOR MANUFACTURING A PISTON

BACKGROUND OF THE INVENTION

1. Field of the Invention

The invention relates to a method for manufacturing a piston.

2. Discussion of the Prior Art

German reference DE 44 10 996 A1 discloses a disk-shaped piston which is produced by press stamping. The raised piston parts on one side of the piston are formed as depressions on the other side. Variants $V_3$ and $V_4$ in FIG. 1 of this reference show a supporting ring at the inner diameter of the piston. The supporting ring is adapted in height to the level of the raised support surfaces for the valve disks, especially when a linear characteristic is required. The stamping process used for manufacturing the piston has been proven successful, but it has not been possible to bring the level position of the support surfaces for the valve disks into conformity with that of the supporting ring to the required extent. Deviations of a few hundredths of a millimeter can lead to variations in damping force which lie outside of the range of tolerances.

One possible solution to this problem could include measuring the supporting rings before installation and then inserting them, for example, based on the principle used in the manufacture of roller bearings, depending on the piston which is likewise measured. However, this solution cannot be used because the overall manufacturing process is not oriented to a method of this kind.

SUMMARY OF THE INVENTION

It is therefore the object of the present invention to provide a method for manufacturing a piston which solves the problems known from the prior art.

According to the invention, this object is met in that the support on both sides of the piston is stamped from the base body of the piston and the valve support surfaces and the support are machined in the same manufacturing step on a common plane. It is important that all support surfaces/supports for the valve disk lie in a common plane in order to ensure that the valve disk will not be shielded already in the assembled state. Further, the height tolerance of the valve support surfaces in this embodiment is no longer relevant to function.

In this respect, it has turned out to be especially advantageous when the support and the valve support surfaces are polished. The polishing operation results in very high precision and surface quality.

According to another advantageous embodiment of the invention, the support is stamped in a segmentwise manner, wherein a raised segment always alternates in the circumferential direction with an impressed segment for the other side of the piston. A uniform support of the valve disks is achieved in the circumferential direction, especially at the inner diameter.

A segment of the base body of the piston occurs between the segments for the supports in order to prevent excessive loading of the base body of the piston which could lead to a deformation.

With respect to a uniform supporting of the valve disks, the support segments have the same angular orientation to the center of the piston in the circumferential direction as the respective valve support surfaces.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 2 shows a partial section through the piston produced pursuant to the inventive method along line II—II in FIG. 3; and FIG. 3 is a plan view of the piston of FIG. 2 as seen from the side.

DETAILED DESCRIPTION OF THE PREFERRED EMBODIMENTS

Figure 1:
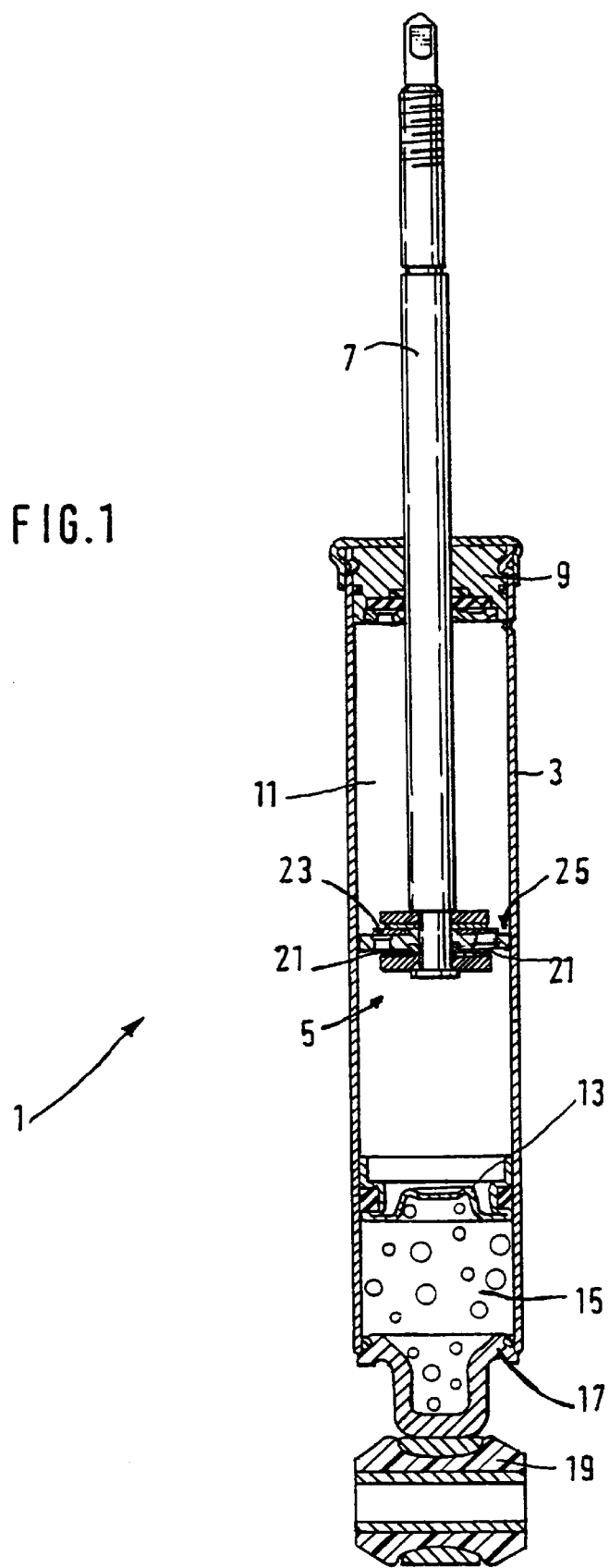
FIG. 1 shows a section through a shock absorber.

FIG. 1 shows, by way of example, a piston-cylinder unit 1 constructed as a single-tube shock absorber. In principle, the invention can also be used in other types of piston-cylinder units.

The single-tube shock absorber 1 substantially comprises a pressure tube 3 in which a piston 5 is arranged at a piston rod 7 so as to be movable axially. At the outlet side of the piston rod 7, a piston rod guide 9 closes a work space 11 which is filled with damping medium and is separated by a dividing piston 13 from a gas space 15 having a base 17 with lug 19 at the end.

During a movement of the piston rod 7, damping medium is forced through damping valves 21 in the piston 5 which are formed by valve disks 23. A piston ring 25 which covers a circumferential surface of the piston 5 prevents damping medium from flowing around the sides of the piston 5 and takes over the reduced-friction guidance of the piston 5.

FIG. 2 shows the piston 5 in section as an individual part without valve disks 23. The piston has a piston base body 27, from which raised valve support surfaces 29 are formed by stamping. Stamped-in inlet openings 31 are located opposite to the raised valve support surfaces 29 on the other side in the piston base body 27, wherein the same volume of the base body of the piston is displaced for the raised areas as for the impressed areas.

The piston has a passage 33 for the piston rod 7. Supports 35 which hold the valve disk(s) (23, see FIG. 1) at the inner region are stamped directly at the edge of the passage 33 in the circumferential direction.

FIG. 3 clearly shows this relationship. The shaded valve support surfaces and the supports which are formed in a segmentwise manner lie in a plane for the valve disks on one side of the piston. For this purpose, a secondary or finishing machining step is carried out after the stamping process, preferably a polishing operation. Accordingly, there is a very high probability that the height tolerance between the supports and the respective valve support surfaces will be eliminated. Greater tolerances easily lead to deviations in the actual damping forces.

The supports 35 are not constructed at random, but rather are preferably always constructed in an angular position with respect to the nearest valve support surface 29. Between the supports 35, there is always a segment 37 on the level of the base body 27 of the piston 5 because, otherwise, a shearing off effect can occur during stamping. Accordingly, there is always a support segment 35 between two segments 37 of the base body of the piston, wherein these two segments 37 adjoin impressions 35' for the support segments of the other side of the piston 5.

Two advantages are essentially achieved by dispensing with the usual supporting ring. First, a height error can be compensated for between the support surfaces and, second, at least one structural component part is economized on.

The invention is not limited by the embodiments described above which are presented as examples only but can be modified in various ways within the scope of protection defined by the appended patent claims.

We claim:

1. A method for manufacturing a piston having a piston body with through-channels for fluid which are covered by valve disks on supporting bodies with valve support surfaces, comprising the steps of:

press stamping a one piece piston body in a disk-shaped manner whereby, starting from a base body of the piston, raised areas of the piston body on one side of the piston are formed as depressions on an axially opposite side of the piston, and at least one support is formed for the valve disks with an axial height adapted to a height of the support surfaces, on both sides of the piston from the base body of the piston; and machining the valve support surfaces and the support in the a common manufacturing step on a common plane.

2. A method according to claim 1, and further comprising the step of polishing the support and the valve support surfaces.

3. A method according to claim 1, wherein the stamping step includes stamping the support in a segmentwise manner so that a raised segment on one side of the piston always alternates in a circumferential direction with an impressed segment for the other side of the piston.

4. A method according to claim 3, wherein the stamping step includes stamping the base body so that a segment of the base body occurs between the segments for the supports.

5. A method to claim 3, wherein the stamping step includes stamping the piston body so that the support segments on one side of the piston have a common angular orientation to a center of the piston in the circumferential direction as the respective valve support surfaces.

* * * * *